United States Patent
Bauer et al.

(10) Patent No.: US 6,792,803 B2
(45) Date of Patent: Sep. 21, 2004

(54) METHOD TO IMPROVE ESTIMATION OF VEHICLE LONGITUDINAL VELOCITY

(75) Inventors: Geoff B. Bauer, Northville, MI (US); Neal W. Jesse, Holly, MI (US)

(73) Assignee: Continental Teves, Inc., Auburn Hills, MI (US)

( * ) Notice: Subject to any disclaimer, the term of this patent is extended or adjusted under 35 U.S.C. 154(b) by 0 days.

(21) Appl. No.: 10/299,158

(22) Filed: Nov. 19, 2002

(65) Prior Publication Data

US 2004/0093945 A1 May 20, 2004

(51) Int. Cl.$^7$ ................. G01P 7/00; G01P 3/00
(52) U.S. Cl. ............. 73/511; 73/488; 73/510; 702/142
(58) Field of Search ............ 73/488, 510, 511; 702/142; 303/170

(56) References Cited

U.S. PATENT DOCUMENTS

| | | | | |
|---|---|---|---|---|
| 5,195,601 A | * | 3/1993 | Voigt et al. ............ | 180/412 |
| 5,863,105 A | * | 1/1999 | Sano ..................... | 303/146 |
| 6,220,085 B1 | * | 4/2001 | Kihara .................. | 73/116 |
| 6,510,373 B2 | * | 1/2003 | Grossardt et al. ....... | 701/72 |
| 2002/0010535 A1 | * | 1/2002 | Nishio ................... | 701/70 |

* cited by examiner

Primary Examiner—Hezron Williams
Assistant Examiner—John Hanley

(57) ABSTRACT

A method for estimating the longitudinal velocity of a vehicle generally comprises the steps of determining whether the vehicle has a lateral acceleration greater than a predetermined value, and then setting the estimate of longitudinal velocity based on the velocity of the wheel having the highest normal force when the vehicle does have a lateral acceleration greater than the predetermined value. The predetermined value is preferably set to reflect the vehicle being in a curve driving situation. The method may further comprise the step of determining whether the vehicle has had a lateral acceleration greater than the predetermined value within a predetermined amount of time. Preferably, when the vehicle is not currently but has had a lateral acceleration greater than the predetermined value within the predetermined amount of time, the estimate of longitudinal velocity is set based on an integration of the vehicle's longitudinal acceleration over time.

14 Claims, 2 Drawing Sheets

METHOD TO IMPROVE ESTIMATION OF VEHICLE LONGITUDINAL VELOCITY

FIELD OF THE INVENTION

The present invention relates generally to stability control systems for vehicles, and more particularly relates to methods for estimating the longitudinal velocity of a vehicle for a stability control system

BACKGROUND OF THE INVENTION

Stability control systems for motor vehicles (also known as dynamic stability programs or "DSP" systems) typically utilize a controller to process information from various sensors throughout the vehicle to ensure that the vehicle remains dynamically stable while undergoing a turning maneuver. That is, factors such as yaw rate and yaw angle or roll rate and roll angle are monitored to ensure they do not exceed certain threshholds. The system is coupled with the vehicle braking system and a drivetrain to restore dynamic stability when the threshholds are reached. These control systems usually estimate a longitudinal velocity of the vehicle for these stability calculations.

Current methods for estimating the longitudinal velocity of a vehicle are based upon a simple general principle. Basically, this principle states that when the vehicle is accelerating, the speed of the slowest wheel (which is generally not slipping) is utilized to estimate the vehicle's longitudinal velocity. When the vehicle is decelerating, the velocity of the fastest wheel (which is generally not slipping) is utilized to estimate the vehicle's longitudinal velocity.

Typically a vehicle includes a speed sensor at each wheel of the vehicle. Accordingly, in a typical four-wheeled vehicle, there will be a front left tire sensor (F.L.T. sensor), a front right tire sensor (F.R.T sensor), a rear left tire sensor (R.L.T. sensor) and a rear right tire sensor (R.R.T. sensor). The current methods will first determine whether the vehicle is accelerating or decelerating. This can be accomplished in numerous ways as is known in the art, such as by monitoring the acceleration and braking pedals, or by monitoring the powertrain system. Then, the speed of either the fastest or slowest wheel is used to estimate the longitudinal velocity.

The present invention provides an improvement to these existing systems and the general principle by increasing the accuracy of the estimation of longitudinal velocity during all driving conditions.

BRIEF SUMMARY OF THE INVENTION

The present invention provides a method for estimating the longitudinal velocity of a vehicle with an increased accuracy during all driving conditions, including situations of high lateral acceleration. Generally, the method comprises the steps of determining whether the vehicle has a lateral acceleration greater than a predetermined value, and then setting the estimate of longitudinal velocity based on the velocity of the wheel having the highest normal force when the vehicle does have a lateral acceleration greater than the predetermined value. The predetermined value is preferably set to reflect the vehicle being in a curve driving situation.

The method may further comprise the step of determining whether the vehicle has had a lateral acceleration greater than the predetermined value within a predetermined amount of time. Preferably, when the vehicle is not currently, but has had a lateral acceleration greater than the predetermined value within the predetermined amount of time, (i.e., coming out of a turn, a slalom situation or lane changing situation), the estimate of longitudinal velocity is set based on an integration of the vehicle's longitudinal acceleration over time. When the vehicle does not and has not had a lateral acceleration greater than the predetermined value within the predetermined amount of time, the estimate of longitudinal velocity is set based on the fastest wheel of the vehicle when the vehicle is decelerating, and based on the slowest wheel when the vehicle is accelerating, according to the general principle.

BRIEF DESCRIPTION OF THE DRAWINGS

The accompanying drawings incorporated in and forming a part of the specification illustrate several aspects of the present invention, and together with the description serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

The general principle for estimating longitudinal velocity, described in the Background section, typically provides a reliable estimate of longitudinal velocity. However, it has been discovered that when the vehicle has a high lateral acceleration, i.e., when the vehicle is turning or otherwise traveling along a curved path, the method of estimating the longitudinal velocity according to the general principle becomes somewhat inaccurate. More specifically, when the vehicle is accelerating during a high lateral force condition, the slowest wheel is slower than the vehicle's longitudinal velocity. Similarly, when the vehicle is decelerating and in a high lateral force condition, the fastest wheel is faster than the vehicle's longitudinal velocity. This is generally because on a curve the inside wheels travel a shorter path and are thus rotating slower, while the outside wheels travel a longer path and are thus rotating faster.

Figure 2:
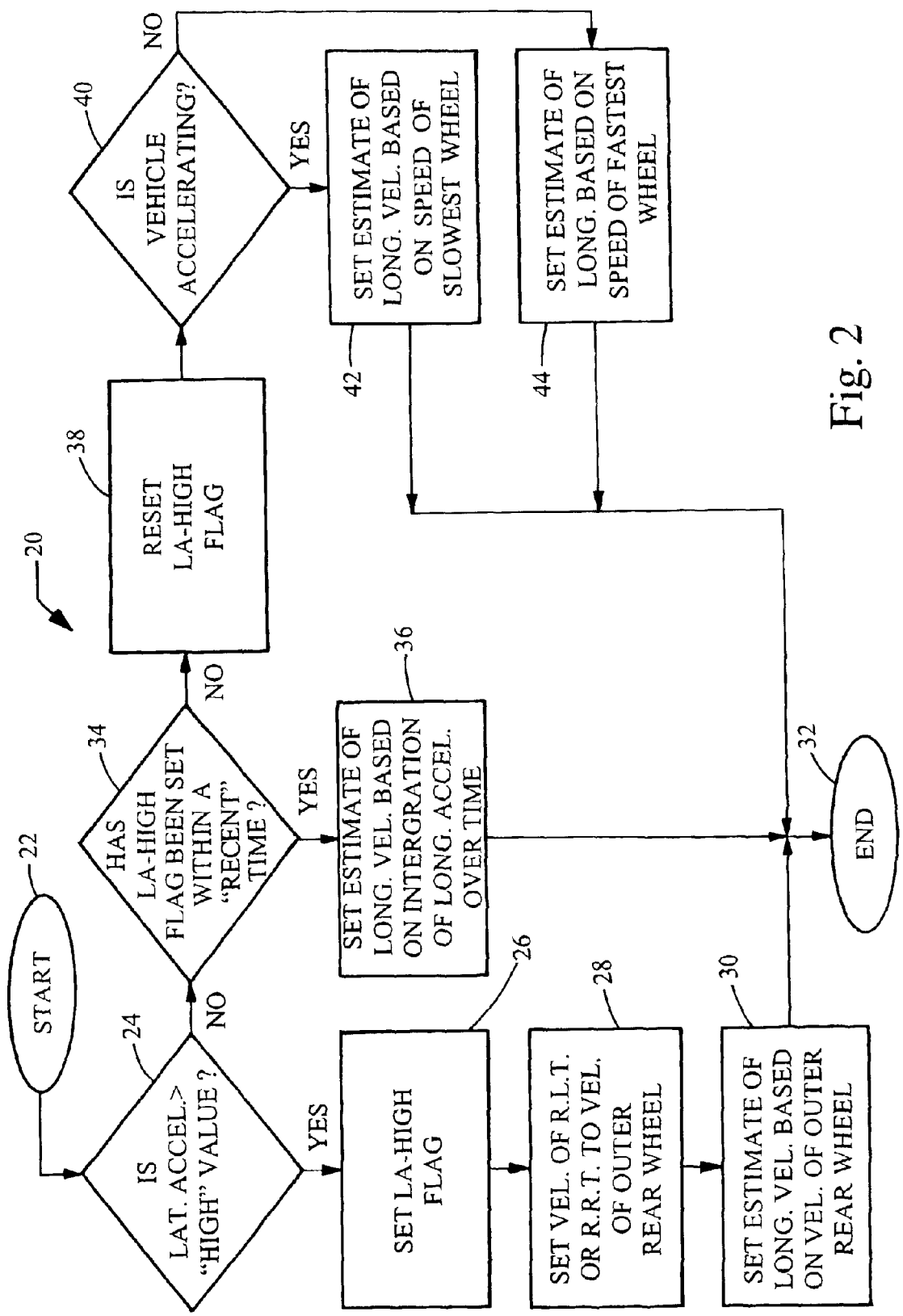
FIG. 2 is a logic flow chart representing the method of estimating the longitudinal velocity of a vehicle in accordance with the teachings of the present invention.

Accordingly, the present invention overcomes this deficiency by providing a new method 20 shown in FIG. 2 for estimating the longitudinal velocity of a vehicle during all driving conditions, including situations with high lateral force and acceleration. Generally speaking, when a vehicle is in a curve driving situation with high lateral acceleration, i.e., when the vehicle is turning, performing a slalom maneuver, or performing a lane change, the invention will consider the velocity of the outside rear wheel to be the most reliable estimate of longitudinal reference velocity. The rear outer wheel will have a high normal force (i.e., the force perpendicular to the ground) and is not typically controlled by the stability control system, and thus is considered to be most closely related to the longitudinal velocity of the vehicle. During transitional driving conditions, such as coming out of a turn or slalom or lane change, where the lateral acceleration has recently been high but is no longer high, the method will mathematically integrate the longitudinal acceleration to calculate an estimate of the longitudinal reference velocity. The amount of time during which the longitudinal acceleration is integrated is limited to avoid accumulated error.

Figure 1:
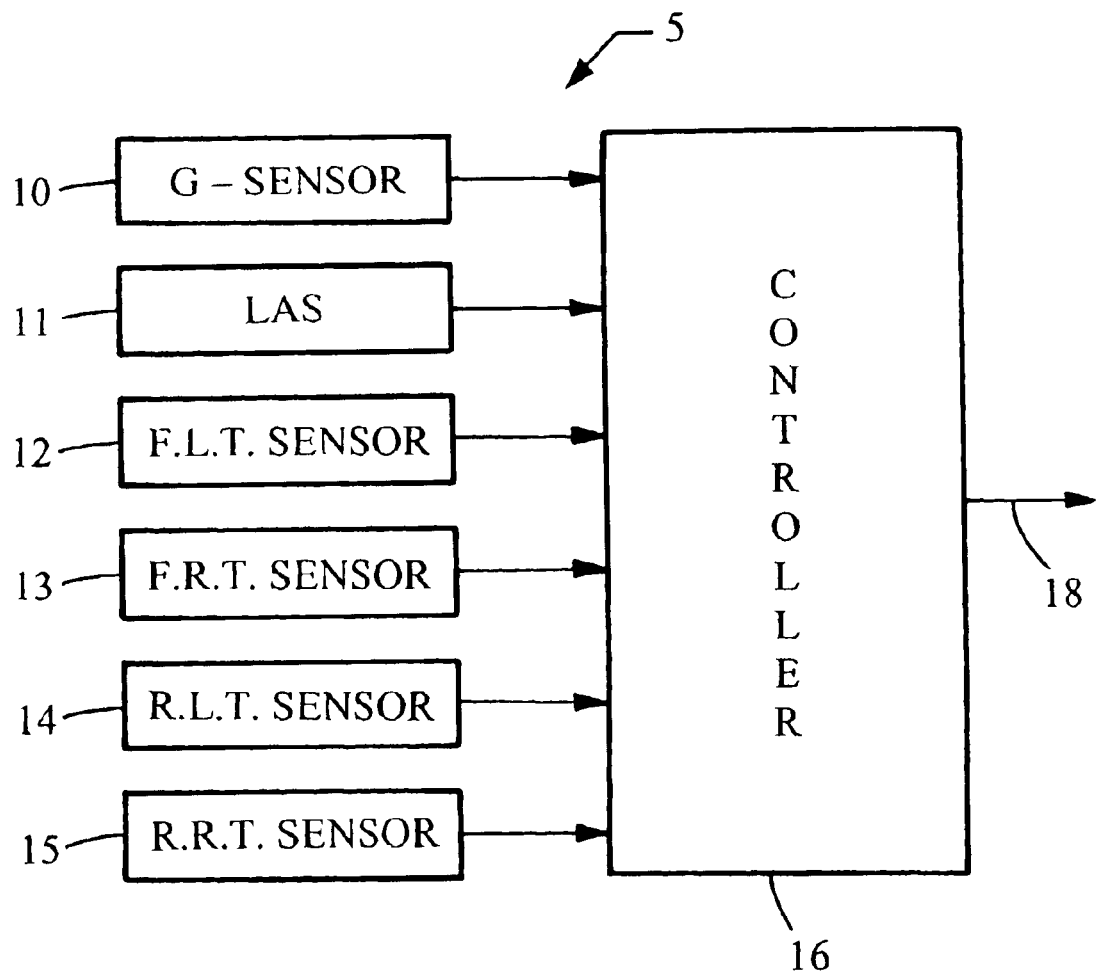
FIG. 1 is a schematic view of a stability control system.

Turning now to the figures, FIG. 1 depicts a rudimentary stability control system 5 having a plurality of sensors providing data to a controller 16. More specifically, a G-sensor or longitudinal acceleration sensor 10 provides output to the controller 16 of the vehicle's longitudinal acceleration. A lateral acceleration sensor (LAS) 11 provides data on the vehicle's lateral acceleration to the controller 16. FIG. 1 depicts a stability control system 5 for a four-wheel vehicle, and hence the system includes one speed sensor for each wheel. More specifically, an F.L.T. sensor 12, an F.R.T. sensor 13, an R.L.T. sensor 14, and an R.R.T. sensor 15 all provide data on the rotational speed of their respective wheels to the controller 16.

The controller 16 also employs the method 20 (FIG. 2) of the present invention to provide an output value 18 representing an estimate of the vehicle's longitudinal velocity. It will be recognized by those skilled in the art that the logic for the method 20 may be located in any controller or CPU within the vehicle that receives, either directly or indirectly, the data from the aforementioned sensors 10–15, and which can house the programming logic for the method 20.

Turning now to FIG. 2, the method starts as indicated by block 22. First, the method 20 determines whether the lateral acceleration of the vehicle is greater than a predetermined "high" value, as indicated by block 24. This "high" value is set to correspond to a driving situation where the vehicle is turning, such as in a curve, a slalom maneuver, or a lane change. Preferably, the "high" value is set in the range of approximately 2 to 10 m/s$^2$.

If the vehicle's lateral acceleration is greater than the predetermined "high" value, the method then sets a LA-HIGH flag, as indicated by block 26. Then, the method 20 determines whether the rear left tire or the rear right tire is the outer tire relative to the direction of turning, as shown in block 28. That is, during high lateral force situations the inner wheels will have low normal force and may even leave the ground. Thus the inner wheels may not reflect vehicle speed. Thus, the method 20 looks to the outer wheels, one of which will have the highest normal force, (i.e., the force perpendicular to the ground), and is the least likely to be slipping. However, the stability control system 5 typically brakes either the front outer wheel or the rear inner wheel, depending on whether the system is controlling over-steer or under-steer, respectively. As the front outer wheel could have a large negative slip due to the stability control system or unknown lateral slip angle in the case of under-steering, that wheel is not selected. Accordingly, the method 20 considers the outer rear wheel as the best estimate of longitudinal velocity. The outer rear wheel is determined based on the direction of turning, which can be determined from numerous inputs, such as steering wheel angle sensors or simply from the sign of the output from the lateral acceleration sensor 11.

Once the method 20 has determined whether the rear right or rear left wheel is the outer rear wheel, the method sets the estimate of longitudinal velocity based thereon, as indicated by block 30. As the wheel sensors 12–15 typically output a rotational speed of the wheel, the controller 16 and method 20 will compute a linear velocity based on the rotational velocity and size of the selected wheel, as will be readily understood by those having skill in the art. Then, the method will flow to its end as indicated by block 32.

Returning now to block 24, if the vehicle's lateral acceleration is not currently greater than the predetermined "high" value, the method will then flow to block 34. Here, the method 20 will determine whether the LA-HIGH flag was set within a predetermined amount of time, i.e., a "recent" time. This determination is made to identify whether the vehicle has recently had a lateral acceleration range value above the "high" value. Preferably, this predetermined "recent" time is set in the range of about 10 ms to 200 ms seconds.

Accordingly, the decision of block 34 identifies transitional driving conditions where the lateral acceleration has recently been "high", but is no longer "high", such as when coming out of a turn or slalom or lane change. If the lateral acceleration has recently been "high" but is no longer, the method 20 will set the estimate of longitudinal velocity based on a mathematical integration of the longitudinal acceleration over time, as indicated in block 36. As was noted in FIG. 1, the stability control system 5 includes a longitudinal acceleration sensor 10 for providing this data. In the first iteration, the estimate of longitudinal velocity based on the wheel with the highest normal force will be adjusted by the integration. Subsequently, the estimated longitudinal velocity will be updated based on the integration. The predetermined time for integration is limited to a relatively small value to avoid accumulated error, such as 10 ms to 200 ms. Once the estimate of longitudinal velocity has been set by block 36, the method flows to its end at block 32.

Returning now to block 34, the method will flow to block 38 when the vehicle does not currently have a "high" lateral acceleration and has not recently had a "high" lateral acceleration. First, the LA-HIGH flag is reset. Then, the method 20 will employ the typical logic of estimating the longitudinal velocity of the vehicle, based on the aforementioned principle. More specifically, the method 20 will determine whether the vehicle is accelerating or decelerating as indicated by block 40. If the vehicle is accelerating, the method will flow to block 42 where the estimate of longitudinal velocity is set based on the slowest wheel. If the vehicle is decelerating, the method will flow to block 44 where the estimate of longitudinal velocity is set based on the velocity of the fastest wheel. In either case, the method will again flow to its end as indicated by block 32.

Accordingly, it can be seen that the present invention provides a robust method for estimating the longitudinal velocity of the vehicle, providing a more accurate estimate when the vehicle is experiencing high lateral acceleration and force, or has recently experienced a high lateral acceleration and force. The present invention provides a new method with low resource consumption that applies a new logic to create an improved longitudinal velocity reference from already existing variables in the stability control system. The method considers the velocity of the outer rear wheel to be the most reliable estimate of longitudinal reference velocity. In this way, the invention overcomes the deficiencies of the prior method which often resulted in inaccurate estimations of longitudinal velocity when the vehicle was turning or otherwise in a situation with high lateral acceleration and low normal force on certain wheels.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for estimating the longitudinal velocity of a vehicle, the method comprising the steps of:
   determining whether the vehicle is currently in a curve driving situation;
   determining whether the vehicle is in a transitional driving situation that is within a predetermined time window after exiting the curve driving situation;
   setting the estimate of longitudinal velocity based on the velocity of one of the outer wheels when the vehicle is in a curve driving situation; and
   setting the estimate of longitudinal velocity based on an integration of the vehicle's longitudinal acceleration over time when the vehicle is in a transitional driving situation.

2. The method of claim 1, wherein the step of setting the estimate of longitudinal velocity is based on the velocity of the outer rear wheel of the vehicle.

3. The method of claim 1, wherein the step of determining whether the vehicle is in a curve driving situation includes comparing the, lateral acceleration of the vehicle to a predetermined value.

4. The method of claim 3, wherein the predetermined value is in the range of 2 m/s$^2$ to 10 m/s$^2$.

5. The method of claim 3, wherein the lateral acceleration of the vehicle is determined from a lateral acceleration sensor.

6. The method of claim 1, wherein the step of setting the estimate of longitudinal velocity includes determining a linear velocity based on the rotational velocity of the selected outer wheel.

7. The method or claim 1, wherein the time of integration is less than 200 ms to avoid accumulated error.

8. The method of claim 1, wherein the vehicle's longitudinal acceleration is determined from a longitudinal acceleration sensor.

9. The method of claim 1, further comprising the steps of:
   setting the estimate of longitudinal velocity based on the slowest wheel of the vehicle when the vehicle is accelerating and when the vehicle is not currently in a curve driving situation or a translational driving situation; and
   setting the estimate of longitudinal velocity based on the fastest wheel of the vehicle when the vehicle is decelerating and when the vehicle is not currently in a curve driving situation or a transitional driving situation.

10. The method of claim 1, further comprising the steps of:
    setting the estimate of longitudinal velocity based on the slowest wheel of the vehicle when the vehicle is accelerating and when the vehicle does not currently have a lateral acceleration greater than the predetermined value and has not had a lateral acceleration greater than the predetermined value within the predetermined time window and
    setting the estimate of longitudinal velocity based on the fastest wheel of the vehicle when the vehicle is decelerating and when the vehicle does not currently have a lateral acceleration greater than the predetermined value and has not had a lateral acceleration greater than the predetermined value within the predetermined time window.

11. A method for estimating the longitudinal velocity of a vehicle, the method comprising the steps of:
    determining whether the vehicle is in a first state defined by a lateral acceleration greater than a predetermined value;
    determining whether the vehicle is in a second state defined by a lateral acceleration less than the predetermined value within a predetermined time window after experiencing the first state;
    setting the estimate of longitudinal velocity based on the velocity of the outer rear wheel of the vehicle when the vehicle is in the first state; and
    setting the estimate of longitudinal velocity based on an integration of the vehicle's longitudinal acceleration over time when the vehicle is in the second state.

12. The method of claim 11, wherein the predetermined value is set to reflect the vehicle being in a curve driving situation.

13. The method of claim 11, wherein the predetermined value is in the range of 2 m/s$^2$ to 10 m/s$^2$.

14. The method of claim 11, wherein the lateral acceleration of the vehicle is determined from a lateral acceleration sensor.

* * * * *